Figure 1:
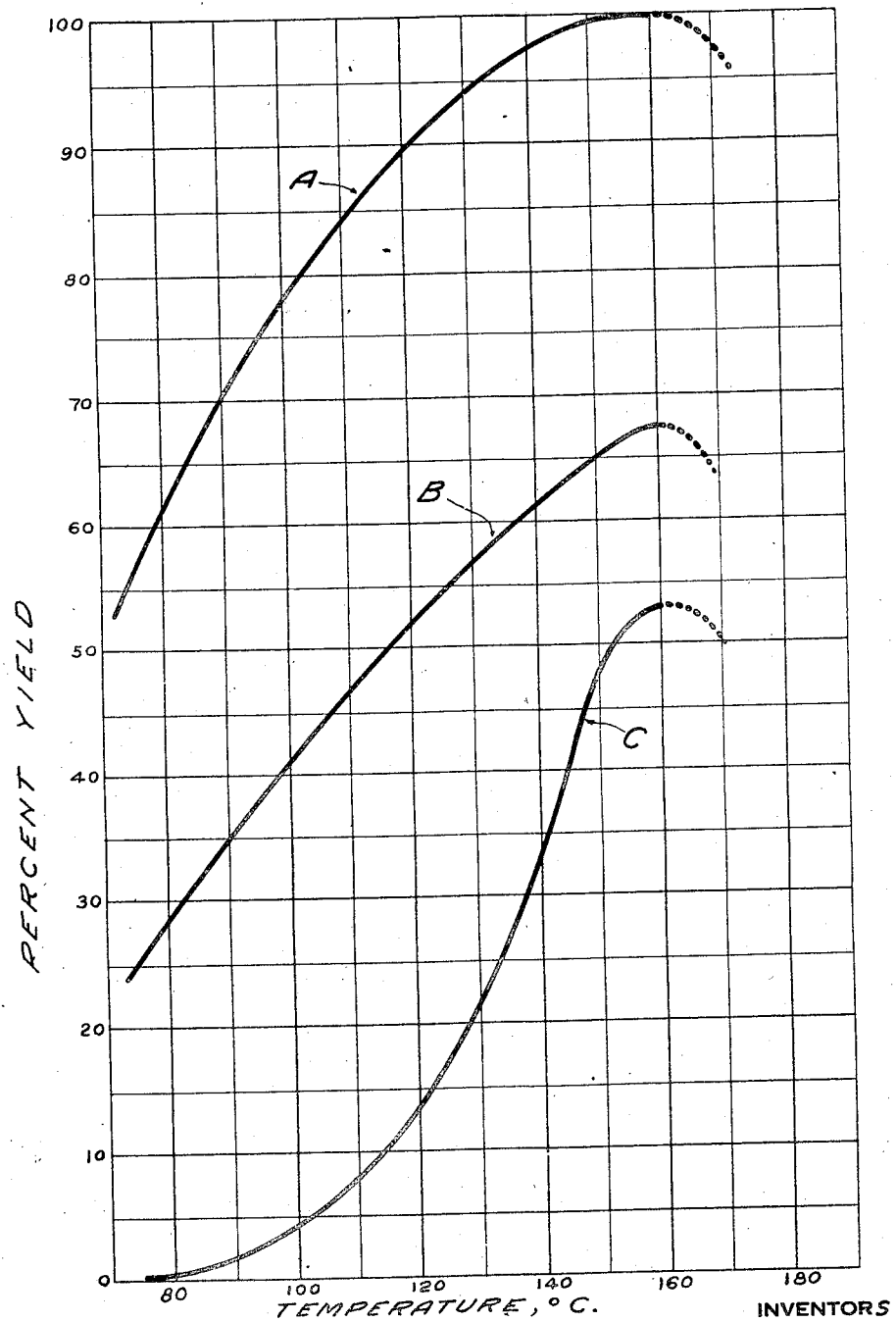

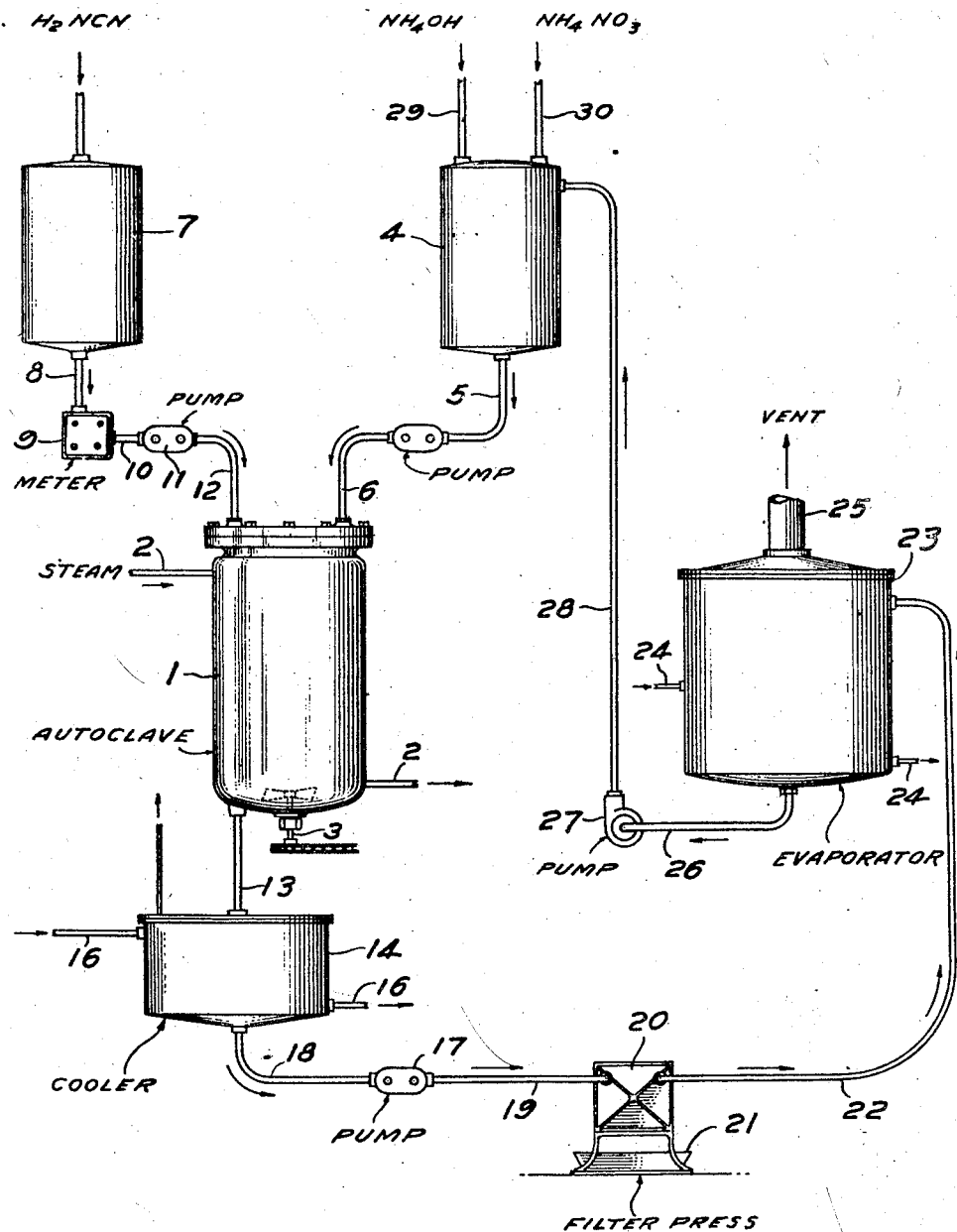

UNITED STATES PATENT OFFICE 2,417,440

PREPARATION OF GUANIDINE SALTS

Joseph H. Paden, Glenbrook, and Alexander F. MacLean, Stamford, Conn., assignors to American Cyanamid Company, New York, N. Y., a corporation of Maine Application July 3, 1943, Serial No. 493,430

11 Claims. (Cl. 260—564)

This invention relates to a new method of preparing guanidine salts.

Although guanidine salts have been known for many years and several methods for their preparation have been suggested, the manufacture of these compounds has not attained the commercial scale warranted by their usefulness. This is due in part to the fact that previously known methods of preparing guanidine salts produce the salts in relatively low yields, of a low degree of purity and require a comparatively long reaction period at high temperature.

One such known process of preparing guanidine salts depends upon the heating of a neutralized solution of cyanamide with suitable ammonium salts in an autoclave at temperatures in excess of 150° C. for about 3 hours or more. At temperatures of less than 100° C. no guanidine salt is said to be formed. Even under the best operating conditions, the yields of guanidine salt by this process are relatively poor. In addition to the desired guanidine salt, it is found that the cyanamide is, in part, converted to numerous kinds and types of impurities such as, specifically, dicyandiamide, urea, biguanide salts, ammonium carbonate, ammeline, ammelide, and other by-products generally designated as insolubles.

The chemistry of this process was believed to involve the direct reaction of cyanamide with an ammonium salt to yield a corresponding guanidine salt. Since it was known that cyanamide is converted to dicyandiamide upon heating, particularly in the presence of alkaline catalysts, and as substantial quantities of dicyandiamide were found in the reaction mixture, particularly during the early stages of the reaction, it was naturally assumed that the presence of alkaline material in the reaction mixture would promote and increase the formation of dicyandiamide. As some dicyandiamide was unavoidably formed it was also assumed that the reaction should be continued at relatively high temperatures for a long period of time in order to bring about the reaction of dicyandiamide with the ammonium salt to form a biguanide salt which upon further reaction with ammonia gave the desired guanidine salt. Accordingly, the reaction was carried out at high temperatures for an extended period of time in the absence of free alkalis. This procedure, however, caused other difficulties since continued heating of the various components present in this complex system resulted in increased amounts of urea and insoluble products of undetermined composition.

Another distinct method of preparing guanidine salts was based on the assumption that the cyanamide was first polymerized to dicyandiamide which compound then reacted with one mole of ammonia to yield biguanide which then reacted with another mole of ammonia to give two moles of guanidine. The guanidinium radical thus formed was believed to then react with an equivalent amount of an acid radical present in the reaction mixture to yield the desired guanidine salt. Accordingly, to increase the formation of dicyandiamide and to supply ammonia for the reactions involved, this process utilized at least one mole of ammonia for each mole of cyanamide employed. More than about two moles of ammonia was not considered desirable since the yields of the product were found to be lower. Only enough acid was present in the reaction mixture as ammonium salt to supply the necessary acid to combine with the guanidine formed therein. This latter process also had the disadvantage of requiring a lengthy reaction time and gave relatively poor yields of a product containing most of the impurities present in the process first described.

The previously described processes of preparing guanidine salts probably follow the reactions postulated for them under the conditions employed and, accordingly, the desired guanidine salt is obtained by these processes in a low degree of purity with poor yields even after heating for several hours. We have discovered, however, that if the reaction conditions are so changed that the reaction is carried out by adding cyanamide to a heated aqueous solution of ammonia and an ammonium salt having a pH of at least 8 at such rate that the unreacted cyanamide in the reaction mixture does not exceed at any time more than about ¼ mole of cyanamide for each equivalent of unreacted ammonium salt in the reaction mixture, guanidine salts having an exceptionally high degree of purity are formed in surprisingly high yields in a matter of minutes. Although cyanamide is readily converted to dicyandiamide under alkaline conditions and, as pointed out above, one prior art process depended upon the formation of dicyandiamide as an intermediate step in the production of guanidine salts, we have found that if cyanamide is added in relatively small proportions to heated aqueous solutions of ammonia and ammonium salt as described, the cyanamide is almost immediately and completely converted to guanidine salt and practically no dicyandiamide, urea, ammonium carbonate, biguanide, ammelide, ammeline or other impurities usually associated with guanidine salts prepared by other known processes is formed or, if at all, in very small amounts.

Under the reaction conditions employed by us, we believe that cyanamide ion first reacts with ammonia to yield guanidinium ion as follows:

(1) $H_2NCN + H_2O \longrightarrow (H_3NCNH)^+ + (OH)^-$ (2) 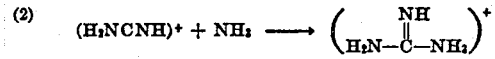

The product of this latter reaction, guanidinium ion, is an extremely active base and reacts readily with ammonium salt to form guanidine salt and more ammonium ion as follows:

(3) 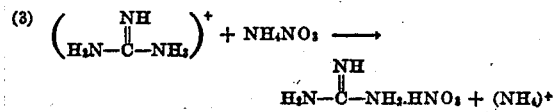

(4) $(NH_4)^+ + (OH)^- \longrightarrow NH_3 + H_2O$

As will be observed these reactions are favored by high concentrations of both ammonia and ammonium salt. The addition of cyanamide in small proportions to an aqueous solution containing free ammonia and ammonium salt allows us to maintain a relatively high concentration of both ammonia and ammonium salt in the reaction mixture. Because of the prompt reaction of the cyanamide under these conditions its concentration is kept down and the formation of dicyandiamide by polymerization thereof is avoided.

The temperature range under which we may carry out our new process varies from about 75° C. to about 225° C. or higher. At temperatures below 75° C. the reaction rate is too slow to be of commercial interest. At temperatures in excess of 180° C. much decomposition occurs on continued heating and the guanidine salt is recovered in low yields and contaminated with undesirable impurities. At temperatures of the order of 200° C. the decomposition rate is such that the reaction mixture can remain at these temperatures for up to about twenty minutes without serious decomposition. Because of the rapidity of the reaction under preferred conditions it is possible to conduct the process at these higher temperatures when the reaction mixture is cooled soon after the reactants are mixed together.

A most important feature of our reaction is the fact that as the cyanamide is added to the solution of ammonium salt and ammonia at higher temperatures, for example 140° C. to 175° C., the formation of guanidine salts is practically instantaneous and in some cases the reaction proceeds almost as fast as the cyanamide can be introduced into the solution. Obviously, since the reaction takes place so rapidly and with such good yields, there is practically no change for the formation of dicyandiamide, urea, biguanides, ammeline, ammelide and other impurities associated with the processes heretofore described.

As another important advantage of our invention, we find that it is possible to prepare guanidine salts in surprisingly good yields at atmospheric pressure at temperatures ranging from about 75° C. to 130° C. At such temperatures the use of pressure autoclaves is unnecessary except when volatile ammonium salts are used. Since, as stated before, we keep the alkalinity of the reaction mixture in excess of pH 8 and as ammonia tends to volatilize readily, we prefer to carry out the reaction when operating at atmospheric pressure with the addition of ammonia to the reaction mixture as the reaction is carried out. This may be easily accomplished by bubbling ammonia gas through the aqueous reaction mixture while the cyanamide is being concurrently added thereto.

The cyanamide used by us may be in the form of the solid crystalline cyanamide, $H_2NCN$, or preferably, in the form of an aqueous solution thereof. Aqueous solutions containing from 20–80% of cyanamide are readily obtained and may be used by us. As the reaction is exothermic, it is not usually necessary that the cyanamide solution be heated when it is added to the heated solution of ammonium salt.

To illustrate our invention in greater particularity, the preparation of guanidine nitrate under preferred conditions will be described in the following example.

Example 1

1000 g. (12.5 moles) of ammonium nitrate was dissolved in 695 g. of 28% ammonium hydroxide to give a 66% solution of ammonium nitrate. This solution which had a pH of 10.0 was placed in an autoclave and heated to a temperature of 160° C. An aqueous solution of cyanamide containing 24% cyanamide was then slowly pumped into the autoclave while maintaining the temperature of the reaction mixture at 160° C. After about 25 minutes, 263 g. (6.25 moles) of cyanamide had been pumped into the autoclave. The autoclave was then cooled, the contents removed and solid guanidine nitrate filtered from the liquid. Upon analyzing both the liquid and the solid product, it was found that guanidine nitrate was obtained with a yield of more than 99% based on the cyanamide introduced into the reaction mixture. This product had an exceptionally high degree of purity.

A plant run using much larger amounts of reactants in a larger autoclave gave substantially the same quantitative yields of guanidine nitrate. In these commercial trials it was found that the cyanamide was converted to guanidine nitrate as fast as the aqueous solution could be pumped into the autoclave.

In order to show the effects of temperature on our reaction, a series of experiments was run at different temperatures. Using the same procedure and proportions of reactants as shown above but using different temperatures enough data were obtained to plot curve A on Figure 1 of the drawing. As will be seen from Figure 1, our reaction produces an almost quantitative yield of guanidine nitrate at a temperature of 160° C. At temperatures of from 140° to 170° C., the yield of guanidine nitrate is well above 95%. At temperatures in excess of 170° C., decomposition products commence to form in the reaction mixture and at 180° C., the formation of these decomposition products seriously lowers the yield of guanidine nitrate.

It will also be noted from curve A of Figure 1 that at temperatures as low as 75° C., a yield of guanidine nitrate well in excess of 50% is obtained. At the lower temperatures the reaction proceeds more slowly but, if the cyanamide is added slowly enough so that its concentration does not exceed more than about ¼ of a mole of unreacted cyanamide for each equivalent of unreacted ammonium salt present in the reaction mixture, better yields than those shown by the curve may be obtained.

To illustrate the very great improvement in yields of guanidine nitrate obtainable by our process over those previously known, guanidine nitrate was prepared by a batch process using excess ammonia but having an equivalent amount of cyanamide present in the reaction mixture for each mole of ammonium salt as shown in the following example.

*Example 2*

640 g. (8 moles) of ammonium nitrate and 525 g. of 28% ammonium hydroxide sufficient to give a 63% solution of ammonium nitrate, were placed in an autoclave. To this mixture, at room temperature, was added 336 g. (8 moles) of cyanamide as a 24% aqueous solution. The autoclave was then closed and heated for one hour at 160° C. The autoclave was then cooled, opened and the contents removed and filtered to separate the guanidine nitrate product. Analysis of the dry solid and the liquid showed that guanidine nitrate was formed with a 67% yield.

A number of other experiments using the same molecular proportion of reactants were run at different temperatures and the results of these several tests were plotted to give B on Figure 1 of the drawing. As will be seen this batch process, in which large proportions of cyanamide were present in the reaction mixture throughout the reaction, also gave a maximum yield at 160° C. However, the yield by this process was more than 32% lower than the yield obtained by our process at the same temperature with a reaction time of only 20 minutes. Increasing the reaction period to 2 or 3 hours raises the overall yields of the process of curve B by only a few percent. The curve B also shows that at lower temperatures the yield of guanidine nitrate is still lower and at 75° C. is so low as to be of no commercial value.

A series of experiments was made using a process in which free ammonia is avoided. These tests were run at different temperatures using the procedure of the following example.

*Example 3*

975 g. (12.2 moles) of ammonium nitrate was dissolved in 525 g. of water to give a 65% solution of ammonium nitrate. This solution and 256 g. (6.1 moles) of cyanamide in the form of a 25.3% aqueous solution were placed in an autoclave and heated with agitation for one hour at 160° C. After cooling and filtering the contents of the autoclave an analysis of the solid and of the filtrate showed the presence of 400 g., or a 53.8% yield, of guanidine nitrate.

Similar experiments were run at different temperatures and curve C of Figure 1 was plotted from the data obtained. Again, maximum yields were obtained at 160° C. However, at lower temperatures the yield of guanidine nitrate dropped rapidly and at 75° C. no guanidine nitrate whatever was obtained. At 100° C., the yield of guanidine nitrate was negligible. Of course, the guanidine nitrate prepared by this procedure and by the procedure of Example 2 was contaminated with large quantities of dicyandiamide, urea and other compounds.

As stated before one of the advantages of our invention lies in the fact that the production of guanidine salts can be conveniently carried out at atmospheric pressure. The following example illustrates the reaction at atmospheric pressure.

*Example 4*

320 parts by weight (4 moles) of ammonium nitrate was mixed with 50 parts of water and placed in a reaction vessel and heated to 110° C. An inlet tube was placed below the surface of the solution and a slow stream of ammonia gas bubbled through during the course of the run. 42 parts (1 mole) of cyanamide in the form of a 23% aqueous solution was added slowly to the reaction mixture over a period of 1½ hours while maintaining the temperature of the reaction mixture at 110° C. After all of the cyanamide solution had been added, the reaction mixture was heated for 10 more minutes after which it was cooled, diluted and analyzed. The analysis showed that guanidine nitrate was obtained with a yield of slightly more than 80% based on the amount of cyanamide added.

In addition to guanidine nitrate just illustrated, many other guanidine salts may be advantageously prepared in exceptionally good yields by our process. Since guanidine is an extraordinarily strong base, it forms comparatively stable salts with many acids. Guanidine salts such as guanidine carbonate, guanidine sulfate, guanidine chloride, guanidine phosphate, guanidine sulfamate, guanidine acetate, guanidine phenolate, guanidine ammelide, guanidine benzoate, guanidine succinate, guanidine propionate, guanidine salicylate and many other guanidine salts can be prepared by our process. The preparation of a few representative salts will be illustrated by means of the following specific examples.

*Example 5*

600 g. (7.8 moles) of ammonium acetate was dissolved in sufficient 28% ammonium hydroxide (834 g.) to give a 50% solution (pH 10.3). The solution was placed in an autoclave and heated with agitation to 140° C. 182 g. (4.33 moles) of cyanamide as a 25% aqueous solution was pumped into the autoclave while maintaining the temperature at 140° C. At the end of the reaction, 20 minutes, the autoclave was cooled and the homogeneous solution obtained was analyzed. Guanidine acetate representing a 96.7% yield was obtained.

*Example 6*

356.5 g. (2.7 moles) of diammonium phosphate and 1273 g. of 28% ammonium hydroxide were placed in an autoclave and heated to 145° C. with agitation and 189 g. (4.5 moles) of cyanamide as a 24% aqueous solution of cyanamide was pumped in. At the end of the reaction, 20-25 minutes, the autoclave was cooled, opened and the solids filtered off. The solid was dried and samples of the dry solid and the filtrate were analyzed for guanidine. Guanidine phosphate was obtained in good yield.

*Example 7*

400 g. of ammonium carbonate and 1300 g. of ammonium hydroxide (28% ammonia) were placed in the autoclave and heated to 150° C., with stirring, over a period of 5 or 10 minutes. Upon reaching 150° C., 600 g. of aqueous cyanamide solution (25%) was pumped in over a period of 25 minutes and the reaction mixture finally stirred for 5 minutes more at 150° C. The autoclave was quickly cooled and the products found to be completely soluble in the solution. A yield of guanidine carbonate of 256 g., represented an 80% conversion of the available cyanamide.

Because the cyanamide is so quickly and completely converted into guanidine salts when following the procedure of our process and as the formation of by-products is reduced to a negligible degree, our process may be advantageously carried out in a cyclic, or continuous, manner. This enables us to produce guanidine salts in large volume at relatively low cost. One such method of carrying out our process is illustrated in Figure 2.

In Figure 2, an autoclave 1 fitted with heating 2 and agitating 3 means is provided. A tank 4 adapted to hold an aqueous solution of ammonium hydroxide and ammonium salt is so arranged that the solution can be pumped therefrom through lines 5 and 6 to the autoclave at a desired rate. A second tank 7 adapted to hold aqueous solution is also provided. Cyanamide from this tank is withdrawn through line 8 at a rate carefully measured by meter 9 and then passed through line 10, pump 11 and line 12 to the autoclave.

In the operation of this cyclic process the ammoniacal liquor containing the ammonium salt is preheated to a selected operating temperature within the range of 75° to 180° C., but preferably within the range of 140° to 170° C. Before the cyanamide solution is pumped into the autoclave, a substantial amount of the ammoniacal solution is already in the autoclave. At our preferred temperatures, the cyanamide reacts almost instantly and completely according to the equations previously given to yield guanidine salt. The reaction mixture in the autoclave is then withdrawn through line 13 into a closed tank 14 fitted with cooling means 16. After the reaction mixture has cooled sufficiently to cause the precipitation of guanidine salt, the aqueous slurry is withdrawn by means of pump 17 through lines 18 and 19 to a filter press 20 of conventional design. The product is recovered in trays 21 when the filter press is opened.

The mother liquor withdrawn from the filter press is run through line 22 and introduced into an evaporator 23 and the mother liquor concentrated. The evaporator is, of course, fitted with heating means 24 in accordance with usual evaporator design. Vapors from the evaporator are removed through vent 25. The concentrated mother liquor is withdrawn through line 26 and pumped by means of the pump 27 through lines 28 back to tank 4. Additional ammonium hydroxide or anhydrous ammonia, and ammonium salt in amounts necessary to build up the concentration of the liquor in tank 4 to a desired operating concentration may be introduced through lines 29 and 30 when necessary.

It will be understood, of course, that numerous variations may be made both in the equipment used and the procedure employed in operating this cyclic process. For example, the autoclave may consist simply of a long heated pipe (not shown) through which cyanamide and an excess of the ammoniacal liquor is pumped at such rate and under such conditions that the reaction is substantially complete when the solution has passed through it. The cooling device may also be a long pipe passing through brine or other cooling media.

In some cases, particularly when preparing the more highly soluble guanidine salts, such as guanidine carbonate, it may be necessary to concentrate the reaction liquor or completely evaporate it before the product can be separated therefrom. In such cases the reaction liquor would flow directly from the reaction zone to an evaporator. Since the evaporation of the liquor from the guanidine carbonate process would involve the volatilization of much ammonia and some carbon dioxide, it is generally advisable to provide means (not shown) to recover these gases. Since the recovery of ammonia and carbon dioxide gases is well understood in the chemical art, a detailed discussion of the steps necessary in their recovery appears to be unnecessary here.

As stated before, we prefer to use an aqueous solution of cyanamide since cyanamide in this form is more readily and cheaply obtained and more easily handled in our process. Solutions containing 20–80% cyanamide are commonly prepared and may be employed by us. Solutions containing less than 20% cyanamide may also be used but their use makes it necessary to evaporate more water to recover the product.

The amount of ammonia in the reaction mixture should be at least sufficent to give the solution at room temperature a pH of 8 or more. Preferably, the reaction is carried out with sufficient ammonia present to give the solution, at room temperature, a pH between 9 and 11. As shown by the equations of our reaction, $NH_3$ is regenerated in the process and it is necessary to add only enough additional ammonia to the liquor to provide for mechanical losses.

The amount of ammonium salt may also vary widely. As the reaction takes place faster at higher concentrations of ammonium salt, we prefer to use solutions containing from 20–70%, or more, of the ammonium salt. This does not mean, however, that our process can not be advantageously operated with lower concentrations of ammonium salt. Dilute solutions of less than 20% ammonium salt can, of course, be employed. We prefer to use the concentrated solutions because of the faster rate of reaction and the greater productive capacity of the equipment under such conditions.

We claim:

1. A method of preparing guanidine salts which comprises the steps of adding an aqueous solution containing from about 20% to 80% by weight of cyanamide to an aqueous solution of ammonia and an ammonium salt having a pH of at least 8 heated to a temperature of at least 75° C. at such rate that the reaction mixture does not contain at any time more than about ¼ mole of unreacted cyanamide for each equivalent of unreacted ammonium salt present therein.

2. A method of preparing guanidine nitrate which comprises the step of adding an aqueous solution containing from about 20% to 80% by weight of cyanamide to an aqueous solution of ammonia and ammonium nitrate having a pH of at least 8 heated to a temperature of 75°–225° C. at such rate that the reaction mixture does not contain at any time more than about ¼ mole of unreacted cyanamide for each mole of unreacted ammonium nitrate present therein.

3. A method of preparing guanidine carbonate which comprises the step of adding an aqueous solution containing from about 20% to 80% by weight of cyanamide to an aqueous solution of ammonia and ammonium carbonte having a pH of at least 8 heated to a temperature of 75°–225° C. at such rate that the reaction mixture does not contain at any time more than about ¼ mole of unreacted cyanamide for each equivalent of unreacted ammonium carbonate present therein.

4. A method of preparing guanidine acetate which comprises the step of adding an aqueous solution containing from about 20% to 80% by weight of cyanamide to an aqueous solution of ammonia and ammonium acetate having a pH of at least 8 heated to a temperature of 75°–225° C. at such rate that the reaction mixture does not contain at any time more than about ¼ mole of unreacted cyanamide for each mole of unreacted ammonium acetate present therein.

5. A method of preparing guanidine salts which comprises the steps of introducing an aqueous solution containing from about 20% to 80% by weight of cyanamide into an aqueous solution of ammonia and an ammonium salt said solution having a pH between 9 and 11 and a temperature within the range of 75°–180° C. at such rate that the reaction mixture does not contain at any time more than about ¼ mole of unreacted cyanamide for each equivalent of unreacted ammonium salt present therein, cooling the reaction mixture after all of the cyanamide has been added and separating the resulting guanidine salt from its mother liquor.

6. A method of preparing guanidine salts which comprises the steps of introducing an aqueous solution containing 20–80% by weight of cyanamide into an aqueous solution containing ammonia and from 20% to 70% by weight of an ammonium salt said solution having a pH between 9 and 11 and a temperature of at least 140° C. at such rate that the reaction mixture does not contain at any time more than about ¼ mole of unreacted cyanamide for each equivalent of unreacted ammonium salt present therein, cooling the reaction mixture when all of the cyanamide solution has been added, and separating the resulting guanidine salt from its mother liquor.

7. A cyclic process of preparing guanidine salts which comprises the steps of adding an aqueous solution containing from about 20% to 80% by weight of cyanamide to an aqueous solution containing ammonia and an ammonium salt said solution having a pH of at least 8 and a temperature of at least 75° C. at such rate that the reaction mixture does not contain at any time more than about ¼ mole of unreacted cyanamide for each equivalent of unreacted ammonium salt present therein, cooling the reaction mixture, separating the resulting guanidine salt therefrom, reheating the separated mother liquor to a temperature within the range of 75°–180° C., and returning the liquor to the process.

8. A cyclic process of preparing guanidine nitrate which comprises the steps of adding an aqueous solution containing from about 20% to 80% by weight of cyanamide to an aqueous solution containing ammonia and ammonium nitrate said solution having a pH of at least 8 and a temperature within the range of 75°–180° C. at such rate that the reaction mixture does not contain at any time more than about ¼ mole of unreacted cyanamide for each mole of unreacted ammonium nitrate present therein, cooling the reaction mixture, separating the resulting guanidine nitrate therefrom, adding additional amounts of ammonia and ammonium nitrate to the mother liquor, reheating the separated mother liquor to a temperature within the range of 75°–180° C. and returning the liquor to the process.

9. A cyclic process of preparing guanidine carbonate which comprises the steps of adding an aqueous solution containing from about 20% to 80% by weight of cyanamide to an aqueous solution containing ammonia and ammonium carbonate said solution having a pH of at least 8 and a temperature within the range of 75°–180° C., at such rate that the reaction mixture does not contain at any time more than about ¼ mole of unreacted cyanamide for each equivalent of unreacted ammonium carbonate present therein, continuing heating of the reaction mixture while evaporating water, ammonia and carbon dioxide therefrom, separating the guanidine carbonate from the concentrated liquor and returning the ammonia and carbon dioxide to the process.

10. A cyclic process of preparing guanidine salts which comprises the steps of pumping an aqueous solution containing from about 20% to 80% by weight of cyanamide into an aqueous solution of ammonia and an ammonium salt said solution having a pH of at least 8 and a temperature of at least 140° C. at such rate that the reaction mixture does not contain at any time more than about ¼ mole of unreacted cyanamide for each equivalent of unreacted ammonium salt present therein, cooling the reaction mixture, separating the resulting guanidine salt therefrom, reheating the separated liquid and returning it to the process with added amounts of ammonia and an ammonium salt.

11. A process of preparing guanidine salts at atmospheric pressure which comprises the steps of adding an aqueous solution containing from about 20% to 80% by weight of cyanamide to an aqueous solution containing an ammonium salt and ammonia dissolved therein, said solution having a pH of at least 8 being heated to a temperature within the range of 75–130° C. at such rate that the reaction mixture does not contain at any time more than about ¼ mole of unreacted cyanamide for each equivalent of unreacted ammonium salt present therein while concurrently bubbling ammonia gas into the reaction mixture.

JOSEPH H. PADEN.
ALEXANDER F. MacLEAN.

REFERENCES CITED

The following references are of record in the file of this patent:

UNITED STATES PATENTS

| Number | Name | Date |
| --- | --- | --- |
| 2,252,400 | Hill et al. | Aug. 15, 1941 |
| 1,441,206 | Blair et al. | Jan. 9, 1923 |
| 2,114,280 | Aldred | Apr. 19, 1938 |
| 2,230,827 | Burns et al. | Feb. 4, 1941 |
| 2,109,934 | Spurlin et al. | Mar. 1, 1938 |
| 2,221,478 | Hill | Nov. 12, 1940 |

OTHER REFERENCES

Sugino et al. (Abst. of Japanese Patent 128,303), Chem. Abs., vol. 34, page 7934.

Certificate of Correction

Patent No. 2,417,440. March 18, 1947.

JOSEPH H. PADEN ET AL.

It is hereby certified that errors appear in the printed specification of the above numbered patent requiring correction as follows: Column 3, line 59, for "change" read *chance*; column 5, line 22, after "give" insert *curve*; column 8, line 60, claim 3, for "carbonte" read *carbonate*; column 9, line 42, claim 7, strike out "within the range of 75°–180° C." and insert instead *of at least 75° C.*; and that the said Letters Patent should be read with these corrections therein that the same may conform to the record of the case in the Patent Office.

Signed and sealed this 15th day of July, A. D. 1947.

[SEAL]

LESLIE FRAZER,
*First Assistant Commissioner of Patents.*